(12) United States Patent
Le Quere

(10) Patent No.: US 7,887,242 B2
(45) Date of Patent: Feb. 15, 2011

(54) COUPLING FOR CABLE CARRIER TUBES

(75) Inventor: Philippe Le Quere, Betton (FR)

(73) Assignee: Legris SAS, Rennes (FR)

( * ) Notice: Subject to any disclaimer, the term of this patent is extended or adjusted under 35 U.S.C. 154(b) by 0 days.

(21) Appl. No.: 12/716,350

(22) Filed: Mar. 3, 2010

(65) Prior Publication Data
US 2010/0178011 A1    Jul. 15, 2010

Related U.S. Application Data

(63) Continuation of application No. PCT/FR2008/001220, filed on Sep. 2, 2008.

(30) Foreign Application Priority Data

Sep. 7, 2007    (FR) ................................. 07 06264

(51) Int. Cl.
G02B 6/38    (2006.01)
G02B 6/00    (2006.01)
(52) U.S. Cl. .......................... 385/56; 385/134; 385/138
(58) Field of Classification Search .................... 385/56, 385/134, 138
See application file for complete search history.

(56) References Cited

U.S. PATENT DOCUMENTS 4,002,345 A    1/1977    Jankowiak
4,548,427 A    10/1985  Press
5,933,556 A *  8/1999   Hawkins ....................... 385/56

FOREIGN PATENT DOCUMENTS

| EP | 0 363 188 A | 4/1990 |
| EP | 0 618 655 A | 10/1994 |
| EP | 1 818 702 A | 8/2007 |
| GB | 2 294 306 A | 4/1996 |

OTHER PUBLICATIONS

The International Search Report in corresponding International Application No. PCT/FR2008/001200.

* cited by examiner

*Primary Examiner*—Uyen-Chau N Le
*Assistant Examiner*—Kajli Prince
(74) *Attorney, Agent, or Firm*—John A. Molnar, Jr.

(57) ABSTRACT

Device for coupling the ends of carrier tubes used for guiding and protecting a cable. The device includes axially juxtaposed first and second tubular bodies, each having a first end for connection to one of the tube ends and a second end for connecting the body portions and which coaxially receives a flexible tubular sealing member. The bodies are connected such that they are relatively movable between a first position in which the body bodies are close together and the sealing member is in a rest state, and a second position in which the bodies are spaced apart and in which surfaces thereof contact the sealing member to dispose it into an energized state wherein it is urged radially inward and has an inner diameter that is no greater than the outside diameter of the cable.

18 Claims, 1 Drawing Sheet

COUPLING FOR CABLE CARRIER TUBES

CROSS-REFERENCE TO RELATED APPLICATIONS

This application is continuation of International Application No. PCT/FR2008/001220 filed Sep. 2, 2008, which designated the United States, and which claims priority to French Patent Application 0706264, filed Sep. 7, 2007, the disclosure of each of which is expressly incorporated herein by reference.

BACKGROUND OF THE INVENTION

The present invention relates to a device for connecting together the ends of tubes for guiding and protecting a cable, and more particularly an optical fiber cable.

Optical fiber cables are replacing copper conductors more and more for data transmission. Nevertheless, optical fiber cables need to be handled with care because of the fragility of optical fibers, thus making them relatively lengthy and expensive to install, and in theory requiring the integrity of each fiber to be verified after installation.

There exists a pneumatic method that greatly simplifies installing optical fiber cables while limiting any risk of them being damaged. The method consists in causing tubes that are connected to one another to pass along the path that is to be followed by the optical fiber cable. Once the tubes have been installed, one end of the cable fitted with a skirt of section slightly smaller than the through section of the tubes is engaged in one end of the tube assembly and air under pressure is injected behind the skirt to push the skirt along the tubes. The tube then serves to guide the cable and once the cable is in place the tubes are left behind in order to protect it.

Coupling devices are usually used for connecting the tubes together in pairs. Each coupling device must serve to ensure that the tubes are connected together in leak tight manner so that the air injected into the tubes can reach a pressure that is high enough to push the cable ends along the entire length of the tubes. The coupling devices also include respective sealing members for ensuring that the cable is clamped in leak tight manner once it is in place in order to isolate the cable from the outside atmosphere and limit any risk of condensation forming and water accumulating inside the tubes. Nevertheless, the sealing member must not prevent the cable from passing through while it is being put into place. That is why the coupling device is generally made in such a manner that the sealing member is retracted while the cable is being put into place and is then caused to project between the tubes so as to come into contact with the outside of the cable once the cable is in place. In present coupling devices, the sealing member is caused to pass from its retracted state to its projecting state by compressing the sealing member axially. The forces that need to be deployed are large and it turns out that manipulating the coupling device is therefore not very practical.

SUMMARY OF THE INVENTION

The present invention is directed to a coupling device of the above-specified type that is easier to use.

To this end, the invention provides a device for coupling together the ends of tubes for guiding and protecting a cable, the device including first and second tubular body portions juxtaposed in axial alignment, each having a first end for connection to one of the tube ends and a second end for connecting together the body portions and that receives a flexible tubular sealing member extending along the axis between the second ends of the body portions, the connection being arranged in such a manner that the body portions are movable relative to each other between a first position in which the body portions are close together and the sealing member is in a rest state, and a second position in which the connection holds the body portions spaced apart and the body portions have contact surfaces making contact with the sealing member and co-operating with the sealing member to bring it into a state in which it is deformed radially inwards, the sealing member in the deformed state having an inside diameter that is no greater than the outside diameter of the cable.

It has been found that the radial deformation of the sealing member can be obtained more easily by moving the body portions apart.

In a particular embodiment of the body portions, an inlet housing is open in the first end to receive the corresponding tube end and is provided with a retainer for retaining the tube in leak tight manner in the housing, and preferably the leak tight retainer including a radially-compressible annular sealing ring that is received in the housing and that, at rest, has an inside diameter that is smaller than an outside diameter of the tube end.

The tubes may then be connected to the coupling device simply and with relatively little force.

Under such circumstances, and advantageously, the sealing member at rest has an inside diameter substantially equal to an inside diameter of the tubes.

The coupling device then has an inside surface that is substantially continuous without any setbacks between the tube ends, which setbacks might run the risk of catching the cable end while it is being passed through the coupling device.

In a particular embodiment of the contact surfaces and the sealing member, the contact surface of the first body portion is a shoulder co-operating with an outer collar of a first end of the sealing member to secure the first body portion axially with the sealing member, and the contact surface of the second body portion presents a shape that tapers towards the first body portion, and the sealing member has a second end with an outside surface of flared shape slidably co-operating with the contact surface of the second body portion when the body portions are taken from their first position towards their second position.

The sliding of the flared outer surface of the second end of the sealing member over the contact surface of the second body portion causes the through section defined by the second end of the sealing member to be narrowed. The shape of the contact surface of the second body portion serves to exert, on the sealing member, a force that has a transverse component and that results from the purely axial force used to move the body portions apart. This shape for the contact surface of the second body portion also serves to limit friction between the sealing member and the second body portion while the body portions are being moved apart.

Under such circumstances, and preferably, the flared outer surface of the second end of the sealing member is extended by an outer collar, and advantageously the outer collar of the second end of the sealing member defines a horn-shaped inside surface.

This shape serves to achieve close contact between the sealing member and the cable.

In a first embodiment of the connection, the second ends of the body portions are engaged in opposite ends of a sleeve forming the connection, the sleeve co-operating via a screw-and-nut connection with the second end of at least one of the body portions and, preferably, the sleeve co-operating via a pivot connection with the second end of the other body portion.

The sleeve enables the body portions to be moved apart progressively by limiting the force that is needed to move them apart.

In a second embodiment of the connection, the second end of the second body portion and the second end of the first body portion are provided externally with portions in relief of complementary shape that are axially offset so as to enable snap-fastening in two axial positions.

This makes it possible to have the connection made integrally with one and/or the other of the body portions.

Other characteristics and advantages of the invention appear on reading the following description of particular, non-limiting embodiments of the invention.

The present invention, accordingly, comprises the construction, combination of elements, and/or arrangement of parts and steps which are exemplified in the detailed disclosure to follow.

BRIEF DESCRIPTION OF THE DRAWINGS

For a fuller understanding of the nature and objects of the invention, reference should be had to the following detailed description taken in connection with the accompanying drawings wherein.

The drawings will be described further in connection with the following Detailed Description of the Invention.

DETAILED DESCRIPTION OF THE INVENTION

Figure 1:
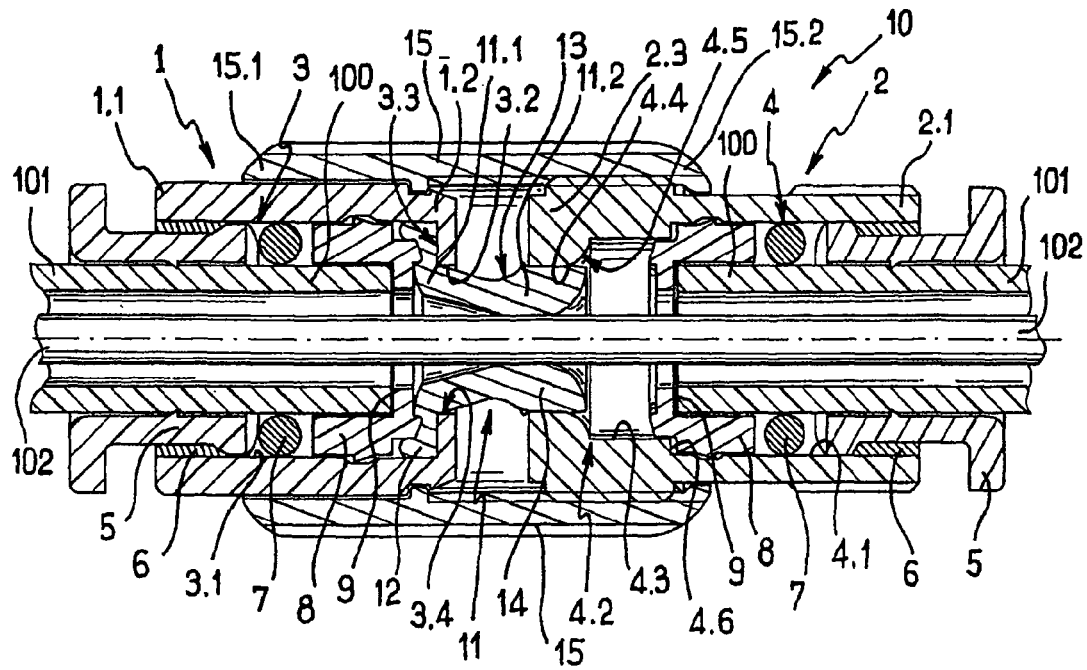
FIG. 1 is a longitudinal section view of a coupling device in accordance with a first embodiment of the invention.
Figure 2:
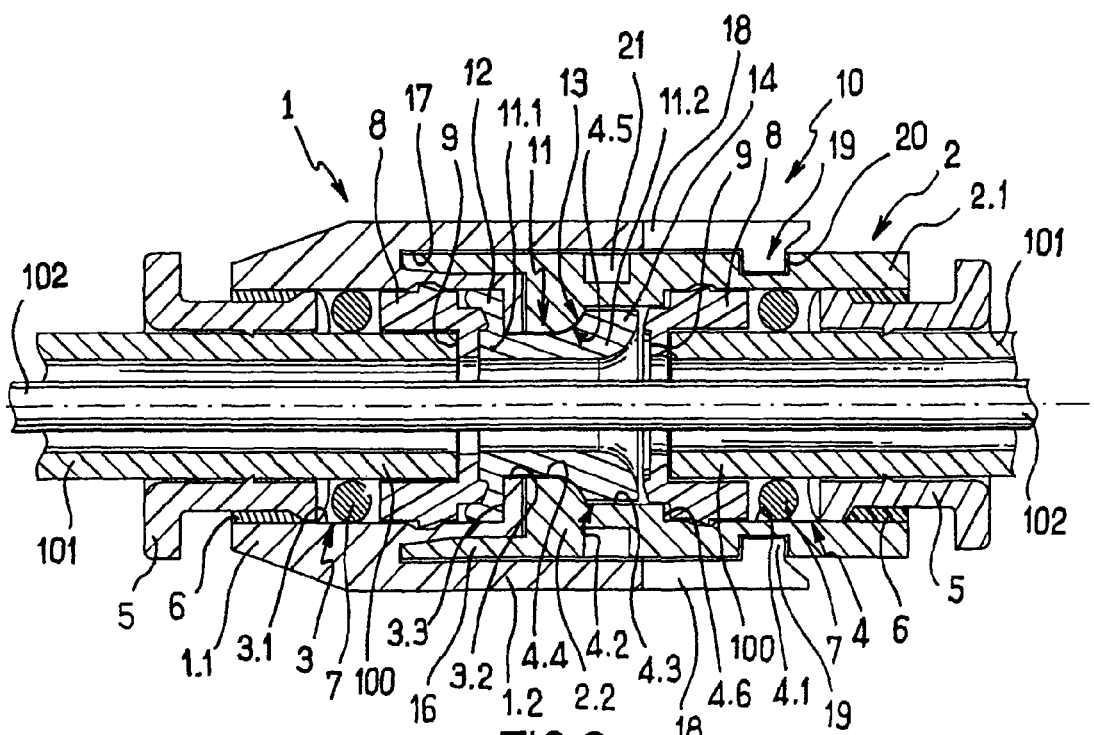
FIG. 2 is a longitudinal section view of a coupling device in accordance with a second embodiment of the invention.

With reference to FIGS. 1 and 2, the invention is described herein in its application to coupling together two ends 100 of tubes 101 used for guiding and protecting an optical fiber cable 102.

The coupling device, given overall reference 10, comprises a first body portion 1 and a second body portion 2 having respective first ends 1.1, 2.1 and opposite respective second ends 1.2, 2.2.

Each body portion 1, 2 is tubular in shape and defines a channel 3, 4 that opens out into the first end 1.1, 2.1 via an inlet segment 3.1, 4.1 for receiving the end 100 of a tube 101 and to the second end 1.2, 2.2 via a segment 3.2, 4.2 for passing the cable 102. Each segment 3.1, 4.1 is connected to the corresponding segment 3.2, 4.2 via a respective radial shoulder 3.3, 4.6.

Each segment 3.1, 4.1 receives a retainer for retaining the end 100 of the tube 101 in leak tight manner. The leak tight retainers are themselves known and in this example they comprise a clamp 5 extending in an insert 6 holding the clamp 5 in the segment 3.1, 4.1, together with an annular sealing ring 7 disposed between the clamp 5 and a terminal guide bushing 8 for guiding the end 100 of the tube 101. The sealing ring 7 has an inside diameter that is slightly smaller than the outside diameter of the tube 101. The bushing 8 possesses an internal shoulder 9 forming an abutment against engagement of the end 100 of the tube 101 in the body portion 1, 2. The insert 6 and the bushing 8 are engaged by force or are snap-fastened (clipped) in the segment 3.1, 4.1.

The segment 3.2 has a through section defined by a cylindrical surface 3.4.

The segment 4.2 has a portion 4.3 adjacent to the segment 4.1 that is defined by a cylindrical surface of diameter smaller than that of the segment 4.1, and a portion 4.4 adjacent to the first portion of the body 1 defined by a surface having a circularly arcuate outline with its convex side facing towards the portion 4.3 and tapering towards the first body portion 1.

A flexible tubular sealing member 11 extends coaxially between the second ends 1.2, 2.2 of the body portions 1, 2. The sealing member 11 possesses an end portion 11.1 received in the body portion 1 and an end portion 11.2 received in the body portion 2 by extending respectively in the segments 3.2, 4.2, the end portion 11.1 projecting into the segment 3.1. The end portion 11.1 is provided externally with a collar 12 that is clamped between the bushing 8 and the radial shoulder 3.3 that thus forms a contact surface of the first body portion 1 for contacting the sealing member 11. The end portion 11.2 is housed in the segment 4.2 and has an outer surface 13 of flared shape that is extended by a collar 14 that defines internally a horn shape. The outer surface 13 co-operates in sliding with the surface having a circularly arcuate outline that forms a contact surface 4.5 of the second body portion 2 making contact with the sealing member 11.

With reference to FIG. 1, the two body portions 1, 2 are united by a sleeve 15 having ends 15.1, 15.2 in which the second ends 1.2, 2.2 of the body portions 1, 2 are engaged. The end 15.1 defines a pivot connection with the second end 1.2 and the end 15.2 defines a screw-and-nut connection with the second end 2.2.

With reference to FIG. 2, the second end 2.2 of the second body portion 2 is extended by a sheath 16 that is slidably engaged in a cylindrical groove 17 of the second end 1.2 of the first body portion 1. The first end 1.2 of the first body portion 1 is extended axially by two elastically deformable blades 18 disposed symmetrically about the longitudinal axis of the coupling device, each having a free end provided with a lug 19, and the second end 2.2 of the second body portion 2 is provided externally with setbacks 20, 21 that are axially offset so as to allow the lugs 19 to snap-fasten in two different axial positions.

The operation of the coupling device is described below.

The tube ends are coupled together in conventional manner.

With the body portions 1, 2 in a close-together position (visible in FIG. 2 showing the second embodiment, the position of the sealing member being identical in the first embodiment), the sealing member 11 is in a rest state in which its inside surface is substantially cylindrical with an inside diameter that is substantially equal to an inside diameter of the tubes. The collar 14 is received in the portion 4.3 of the segment 4.2.

The cable 102 is blown into the tubes, with the inside surface of the sealing member 11 guiding the end of the cable 102 from one tube to the other.

Once the cable 102 is in place in the tubes 101, the body portions 1, 2 are brought into their spaced-apart position (visible in FIG. 1, showing the first embodiment, the position of the sealing member being identical in the second embodiment) by unscrewing the sleeve 15 (in the first embodiment), or by snap-fastening the lugs 19 in the setbacks 21 (second embodiment). The outer face 13 slides over the contact surface 4.5, thereby bringing the sealing member 11 into a state in which it is deformed radially inwards, the sealing member 11 in the deformed state having an inside diameter that is no greater than the outside diameter of the cable 102. When the body portions are in their spaced-apart position, the collar 14 is on the smallest diameter portion of the contact surface 4.5 so that the horn-shaped inside surface is pressed strongly against the cable 102.

Naturally, the invention is not limited to the embodiments described but covers any variant coming within the ambit of the invention as defined by the claims.

The connection may be of a structure different from that described, for example they may comprise a sleeve having ends tapped with oppositely-handed threads so as to receive the threaded second ends of the body portions or catches formed on the second end of one of the body portions engaged in the second end of the other body portion.

The ends of the sealing member and the contact surfaces of the body portions may be identical to the end 11.2 and to the contact surface 4.5 as described above.

The leak tight retainer may include an elastically-deformable toothed catch washer.

As it is anticipated that certain changes may be made in the present invention without departing from the precepts herein involved, it is intended that all matter contained in the foregoing description shall be interpreted in as illustrative rather than in a limiting sense. All references including any priority documents cited herein are expressly incorporated by reference.

What is claimed is:

1. A coupling for connecting a first tube end of a first tube to a second tube end of a second tube, the first and the second tube receiving a cable coaxially therethrough, the cable having an outside diameter and the coupling comprising:
    a tubular first body and a tubular second body aligned coaxially with the first body, each body having a first body end for connection to a corresponding one of the tube ends and a second body end disposed opposite the second body end of the other body and being axially moveably connected thereto, the second body end of the second body having an inner contact surface; and
    an annular resilient seal member aligned coaxially with the first and the second body, the seal member having a first seal end received in the second body end of the first body and a second seal end received in the second body end of the second body, and the seal member having in a free state an inside diameter greater than the outside diameter of the cable,
    whereby with the first tube end being received in the first body end of the first body and the second tube end being received in the second body end of the second body, and the cable being received coaxially through the first and the second tube, the second body is axially moveable relative to the first body between a first position of the bodies wherein the body second ends are axially spaced-apart a first distance with the seal member being disposed in its free state, and a second position of the bodies wherein the body second ends are axially spaced-apart a second distance and the contact surface of the second body end of the second body radially compresses the seal member into an energized state wherein the inside diameter thereof sealingly engages the outside surface of the cable, wherein the first distance is less than the second distance.

2. The coupling of claim 1 further comprising:
    an annular first retainer received coaxially in the first body end of the first body, the first tube end of the first tube being retained coaxially in the first retainer; and
    an annular second retainer received coaxially in the first body end of the second body, the second tube end of the second tube being retained coaxially in the second retainer.

3. The coupling of claim 1 wherein:
    the first seal end is fixedly retained in the second body end of the first body;
    the second seal end is freely received in the second body end of the second body; and
    the contact surface of the second body end of the second body contacts the second seal end in the second position of the bodies to radially compresses the seal member into its energized state.

4. The coupling of claim 3 wherein:
    the second seal end is configured as a radially outwardly extending flare;
    the second end of the second body is configured as a radially inwardly extending second body shoulder; and
    in the first position of the bodies, the second body shoulder is disposed axially beyond the flare.

5. The coupling of claim 3 wherein the first seal end is configured as a radially outwardly extending collar, and the second body end of the first body is configured as a radially inwardly extending first body shoulder, the coupling further comprising:
    an annular bushing received coaxially in the second body end of the first body, the bushing having a radially inwardly extending bushing shoulder facing the first body shoulder, the collar being clamped between the bushing shoulder and the first body.

6. The coupling of claim 1 further comprising:
    a tubular sleeve having a first sleeve end disposed coaxially over the second body end of the first body and a second sleeve end disposed coaxially over the second body end of the second body, the second body end of the first body being fixedly retained in the sleeve and the second body end of the second body being axially moveably retained in the sleeve,
    whereby the second body is axially moveable relative to the first body by the axial movement of the second body end of the second body in the sleeve.

7. The coupling of claim 6 wherein:
    the second sleeve end is rotatably threadedly connected to the second body end of the first body; and
    the second body is axially moveable relative to the first body by the rotation of the sleeve.

8. The coupling of claim 1 wherein:
    the second body end of the first body and the second body end of the second body are interferingly engaged; and
    the second body is slidably axially moveable relative to the first body.

9. The coupling of claim 8 wherein:
    the second body end of the first body extends axially over the second body end of the first body and has a radially inwardly extending lug; and
    the second body of the second body has a first groove facing the lug and a second groove facing the lug,
    whereby the lug is receivable in the first lug disposing the bodies in the first position, and
    whereby the lug receivable in the second lug disposing the bodies in the second position.

10. An assembly comprising:
    first tube having a first tube end;
    a second tube having a second tube end, the first and the second tube receiving a cable coaxially therethrough, the cable having an outside diameter; and
    a coupling for connecting the first tube end to the second tube end, the coupling comprising:
    a tubular first body and a tubular second body aligned coaxially with the first body, each body having a first body end for connection to a corresponding one of the tube ends and a second body end disposed opposite the second body end of the other body and being axially moveably connected thereto, the second body end of the second body having an inner contact surface; and an annular, resilient seal member aligned coaxially with the first and the second body, the seal member having a first seal end received in the second body end of the first body and a second seal end received in the second body end of the second body, and the seal member having in a free state an inside diameter greater than the outside diameter of the cable, whereby with the first tube end being received in the first body end of the first body and the second tube end being received in the second body end of the second body, and the cable being received coaxially through the first and the second tube, the second body is axially moveable relative to the first body between a first position of the bodies wherein the body second ends are axially spaced-apart a first distance with the seal member being disposed in its free state, and a second position of the bodies wherein the body second ends are axially spaced-apart a second distance and the contact surface of the second body end of the second body radially compresses the seal member into an energized state wherein the inside diameter thereof sealingly engages the outside surface of the cable, wherein the first distance is less than the second distance.

11. The assembly of claim 10 further comprising:
an annular first retainer received coaxially in the first body end of the first body, the first tube end of the first tube being retained coaxially in the first retainer; and
an annular second retainer received coaxially in the first body end of the second body, the second tube end of the second tube being retained coaxially in the second retainer.

12. The assembly of claim 10 wherein:
the first seal end is fixedly retained in the second body end of the first body;
the second seal end is freely received in the second body end of the second body; and
the contact surface of the second body end of the second body contacts the second seal end in the second position of the bodies to radially compresses the seal member into its energized state.

13. The assembly of claim 12 wherein:
the second seal end is configured as a radially outwardly extending flare;
the second end of the second body is configured as a radially inwardly extending second body shoulder; and
in the first position of the bodies, the second body shoulder is disposed axially beyond the flare.

14. The assembly of claim 12 wherein the first seal end is configured as a radially outwardly extending collar, and the second body end of the first body is configured as a radially inwardly extending first body shoulder, the coupling further comprising:
an annular bushing received coaxially in the second body end of the first body, the bushing having a radially inwardly extending bushing shoulder facing the first body shoulder, the collar being clamped between the bushing shoulder and the first body.

15. The assembly of claim 10 further comprising:
a tubular sleeve having a first sleeve end disposed coaxially over the second body end of the first body and a second sleeve end disposed coaxially over the second body end of the second body, the second body end of the first body being fixedly retained in the sleeve and the second body end of the second body being axially moveably retained in the sleeve,
whereby the second body is axially moveable relative to the first body by the axial movement of the second body end of the second body in the sleeve.

16. The assembly of claim 15 wherein:
the second sleeve end is rotatably threadedly connected to the second body end of the first body; and
the second body is axially moveable relative to the first body by the rotation of the sleeve.

17. The assembly of claim 10 wherein:
the second body end of the first body and the second body end of the second body are interferingly engaged; and
the second body is slidably axially moveable relative to the first body.

18. The assembly of claim 17 wherein:
the second body end of the first body extends axially over the second body end of the first body and has a radially inwardly extending lug; and
the second body of the second body has a first groove facing the lug and a second groove facing the lug,
whereby the lug is receivable in the first lug disposing the bodies in the first position, and
whereby the lug receivable in the second lug disposing the bodies in the second position.

* * * * *